United States Patent [19]

Sieksmeyer et al.

[11] Patent Number: 5,134,078
[45] Date of Patent: Jul. 28, 1992

[54] PROCESS AND PLANT FOR THE REMOVAL OF SOIL CONTAMINANTS

[75] Inventors: Rolf Sieksmeyer, Nordenham; Walter Mevius, Hamburg, both of Fed. Rep. of Germany

[73] Assignee: Norddeutsch Seekabelwerke Aktiengesellschaft, Nordenham, Fed. Rep. of Germany

[21] Appl. No.: 746,814

[22] Filed: Aug. 15, 1991

Related U.S. Application Data

[63] Continuation of Ser. No. 213,867, Jun. 30, 1988, abandoned.

[30] Foreign Application Priority Data

Jul. 3, 1987 [DE] Fed. Rep. of Germany ....... 3721981

[51] Int. Cl.⁵ .............................................. C02F 3/04
[52] U.S. Cl. ..................... 435/262; 210/150; 210/151; 210/170; 210/605; 210/615; 210/617; 210/760; 210/783; 210/901; 435/264; 435/281
[58] Field of Search ...................... 435/262, 264, 281; 210/150, 151, 605, 615, 617, 170, 760, 783, 901

[56] References Cited

U.S. PATENT DOCUMENTS

| | | | |
|---|---|---|---|
| 2,366,917 | 1/1945 | Levine | 210/617 |
| 4,029,578 | 6/1977 | Turk | 210/760 |
| 4,401,569 | 8/1983 | Jhaveri et al. | 435/281 X |
| 4,468,326 | 8/1984 | Kawert | 210/619 |
| 4,543,013 | 9/1985 | Wagner et al. | 210/170 X |
| 4,582,611 | 4/1986 | Wang | 210/170 X |
| 4,595,506 | 6/1986 | Kneer | 210/783 X |
| 4,713,343 | 12/1987 | Wilson et al. | 435/247 X |
| 4,721,570 | 1/1988 | Ankaitis | 210/151 X |
| 4,755,304 | 7/1988 | Hallberg et al. | 435/262 X |

FOREIGN PATENT DOCUMENTS

| | | |
|---|---|---|
| 0054248 | 6/1982 | European Pat. Off. |
| 0182380 | 10/1987 | European Pat. Off. |
| 0279719 | 8/1988 | European Pat. Off. |
| 3537307 | 4/1987 | Fed. Rep. of Germany |
| 1557156 | 1/1968 | France |

OTHER PUBLICATIONS

Handbook bodemsaneringstechnieken, Staatsuitgeverij, Den Haag, 1985.
Abwassertechnische Vereinigung, "Lehr- und Handbuch der Abwassertechnik", 1985.
GWF-Wasser/Abwasser, "Beseitigung einer Untergrundkontamination mit Kohlenwasserstoffen durch mikrobiellen Abbau", 1984.
Ministerie van Volkshuisvesting, Ruimtelijke Ordening en Milieubeheer, "Behandling Percolatiewater Storttereinen deel B", 1986.

Primary Examiner—Timothy M. McMahon
Attorney, Agent, or Firm—Sughrue, Mion, Zinn, Macpeak & Seas

[57] ABSTRACT

In order to remove underground contamination, it has already been disclosed either to replace the soil, to wash the soil, to draw off the soil air or to carry out ground water desorption. All these processes are very complex and cost intensive. In particular, they do not provide a final solution to the problem, but instead merely move the problem, since the substances removed from the water to be purified are retained and must accordingly be stored safely, for example in waste dumps. The invention is an improved process and plant of this type which is simple and inexpensive to carry out and fully degrades the substances removed from the (ground) water. The object of the invention is achieved by, on the one hand, flushing through the soil, in particular its contaminated zone (17), and, in addition, biologically purifying the (ground) water. The process and the plant are particularly suitable for removing underground water contamination by hydrocarbons on old industrial sites.

14 Claims, 3 Drawing Sheets

5,134,078

PROCESS AND PLANT FOR THE REMOVAL OF SOIL CONTAMINANTS

This is a continuation of application Ser. No. 07/213,867, filed Jun. 30, 1988 now abandoned.

BACKGROUND OF THE INVENTION

The invention relates to a process for removing soil contaminants, in particular for purification of ground water, and a plant used, in particular, for carrying out this process.

As a consequence of increasing environmental consciousness, attempts are being made to eliminate disclosed underground contamination, in particular by hydrocarbons. These are frequently observed on old or previous sites of chemical or petrochemical plants where little or no attention has been paid in the past to full prevention of soaking of pollutants into the soil, thus causing ground water contamination. To carry out purification of ground water here is extremely difficult. In particular, such purification measures can only be carried out long-term at considerable expense. As a rule of thumb, it can be assumed that purification of ground water takes about the same time as that over which contamination of the ground water present in the soil has occurred.

Several purification processes are already known for this purpose. One process comprises replacing the soil in contaminated areas. However, this merely results in the problem being moved to special dumps. In addition, the cost of soil replacement is extremely high. Soil washing or thermal soil treatment is also known. This process is extremely complex and cost intensive. Finally, purification by drawing off the soil air with alternate or simultaneous ground water desorption is known. Here, the contaminated soil air and the exhaust air produced on stripping the contaminated ground water are purified in activated charcoal filters. In this case, the problem is merely shifted to the activated charcoal. This must namely again be stored in special dumps. In addition, this process is very time consuming. It also requires high equipment and energy costs.

SUMMARY OF THE INVENTION

With this situation as a base, the invention has the object of providing a process and a plant of the type mentioned in the introduction, which process can be carried out at low expense without relocation of the pollutants.

The combination of biological purification of the water and flushing through of the soil means that the process according to the invention operates particularly economically since the flushing ensures optimum pollutant removal with the withdrawn water and biological water treatment processes are extremely effective, in spite of the low energy requirement. In particular, the substances removed from the water, to be precise the halogenated hydrocarbons which are particularly difficult to degrade, are degraded virtually entirely in the biological purification. Absolutely no secondary substances requiring disposal, i.e. which must finally be stored in special waste dumps, are thereby produced in this process. In the process according to the invention, there is thus no relocation of the pollutants, as is frequently necessary in the processes of this type which are already known.

The biological purification expediently takes place in consecutive anaerobic and aerobic biological steps, the equipment for which is combined. This equipment can be matched to the particular purification case, is compact and is operated at low energy cost. The last-mentioned criterium is particularly important since experience shows that purification measures of this type require a period of several years.

According to a further proposal of the invention, the sparingly soluble residual contaminants in the soil, in particular dissolved hydrocarbons, are eliminated directly before or during re-introduction into the soil of the water purified thus far. According to a further proposal of the invention, a likewise biological slow filter, which is colonized by a long-lived biosystem, is used for this purpose. In this long-time filter, the residual contaminants are purified without any supply of external energy virtually during re-introduction of the water into the soil.

Finally, it is proposed, as far as the process is concerned, to flush through the soil by lowering the (ground) water level on withdrawal of the water to be purified and raising it again on re-introduction of the purified water. The hydraulic pressure gradient thus produced causes a flushing stream. It is particularly advantageous if, at the same time, the withdrawal point and the re-introduction point are separated in a manner such that the water re-introduced into the soil flows, on the way to re-withdrawal, in the direction of the (ground) water flow. This produces a particularly effective flushing stream, which, together with the above-ground location of the purification and filtration equipment, forms a closed circuit.

Through the use of dipping drum reactors, the equipment for which is combined, the biological purification equipment has very compact dimensions. It is therefore readily transportable, i.e. can easily be constructed and dismantled at the place of purification. In particular, the purification equipment can thus easily be accommodated in standardized large-volume containers, which can easily be installed on site without notable construction costs.

Further features of the invention relate to the design of a slow filter for eliminating the residual contaminants. According to the invention, this is designed as a pond-like percolation basin, which, on the one hand, is easy to produce, namely merely requires soil excavation, and, if desired, is provided with a bed made from a filter layer, in particular gravel, and may be with sheeting for covering the side walls and/or the base. This is then colonized by a long-lived biosystem, which slowly eliminates sparingly soluble residual contaminants, and does so without any moving parts in the percolation basin, meaning that no additional energy costs are necessary for removing the residual contaminants. In addition the water holding capacity of the long-time filter, i.e. of the percolation basin, can be sufficiently large so that continuous reintroduction of the purified water is ensured during any malfunctions in the purification equipment, and the flushing flow in the soil is thereby always maintained. In addition, the flushing basin can without notable costs be sufficiently large so that an adequately long residence time of the water to be re-purified is ensured therein and so that, on the other hand, an intermediate store is formed for the case where the biological purification equipment temporarily discharges more biologically purified water than the percolation basin can soak back into the soil.

An illustrative embodiment of the plant according to the invention and of the course of the process thereof are illustrated in greater detail below with reference to the drawings, in which:

DETAILED DESCRIPTION OF THE PREFERRED EMBODIMENT

Figure 1:
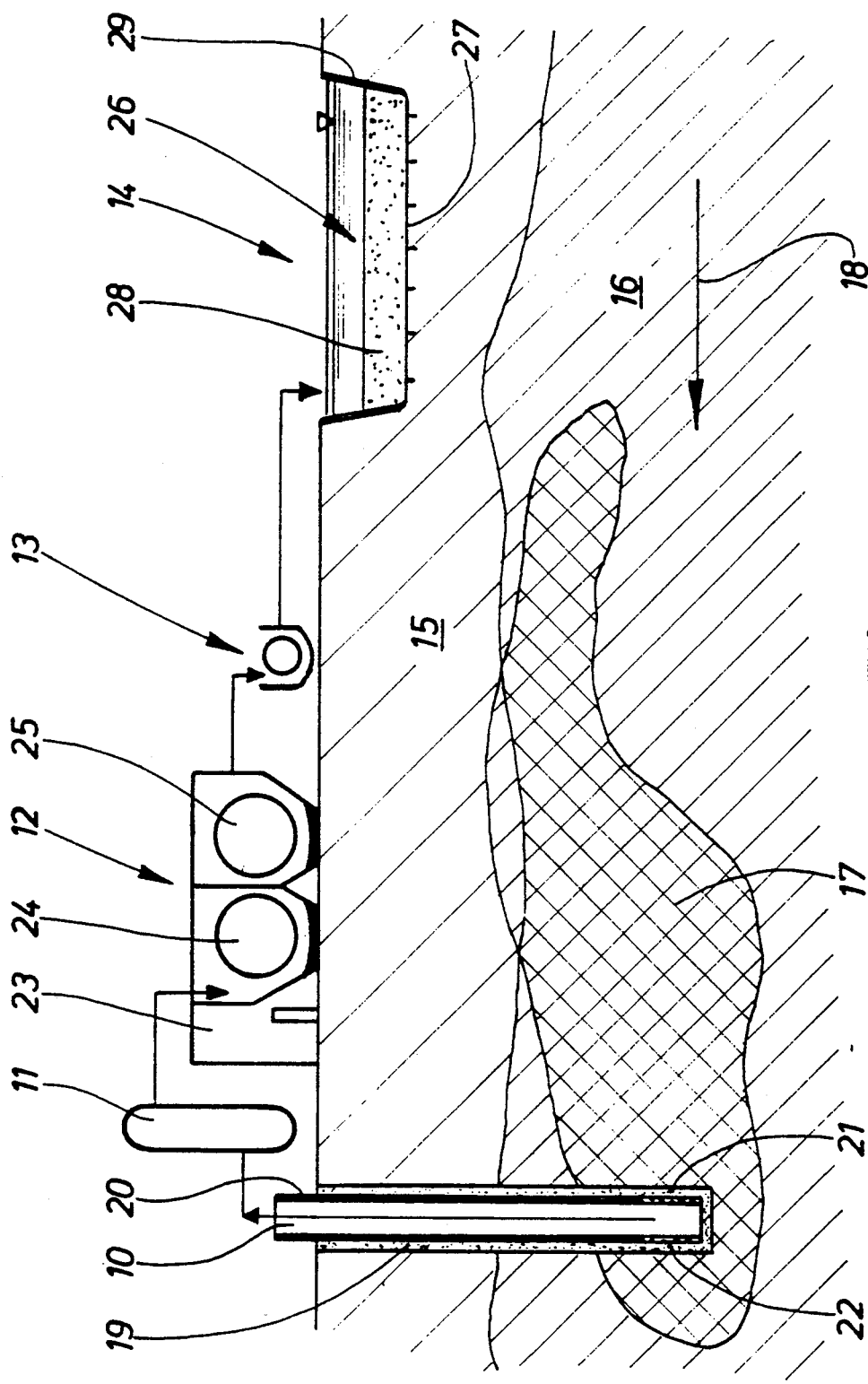
FIG. 1 shows a schematic overall view of the plant with a vertical section through the purification area.
Figure 2:
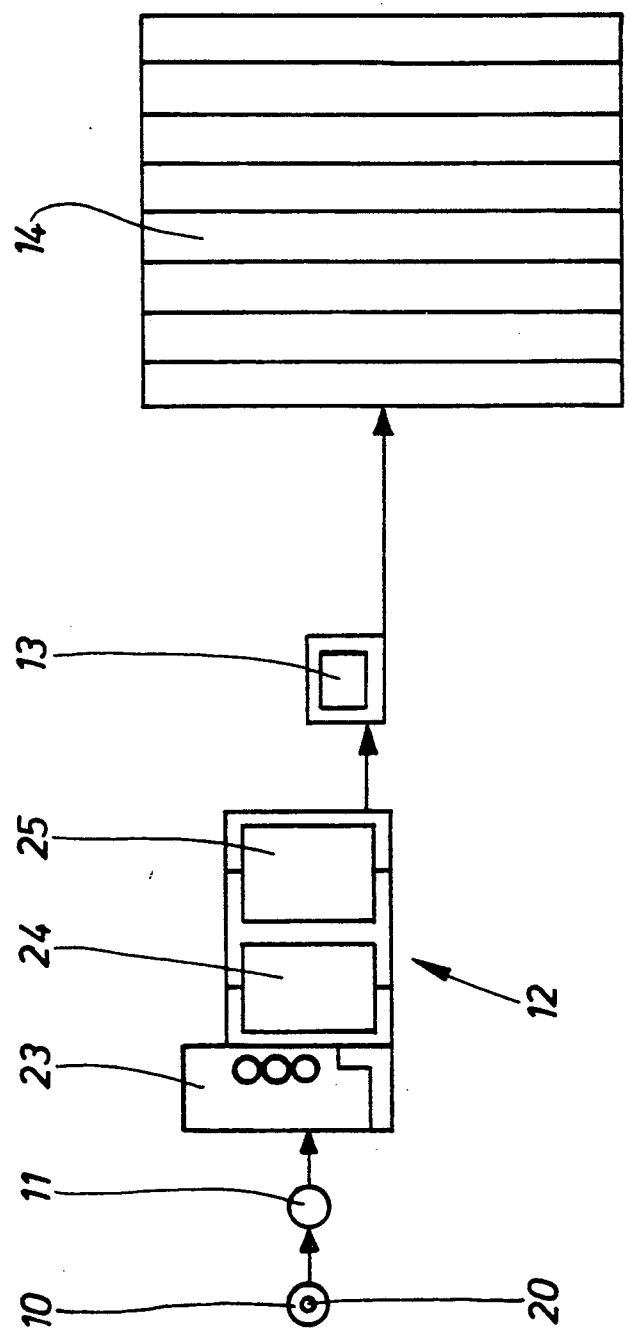
FIG. 2 shows a plan view of the plant as in FIG. 1.

The plant shown here is used for purification of ground water, in particular for removing hydrocarbons from the ground water.

This plant contains a ground water withdrawal shaft in the form of a deep well 10, an ozonization unit 11, biological purification equipment 12, a mechanical belt-discharge drum filter 13 and a slow filter 14.

In the case shown here, the soil structure shows an upper water-unsaturated zone 15, an underlying (closely hatched) water-saturated zone 16 and a (cross-hatched) contaminated zone 17 located in the latter. The ground water flow direction 18 is marked by the arrow drawn in the water-saturated zone 16.

In the illustrative embodiment shown here, the deep well 10 comprises a filter pipe 20 sunk into an appropriate bore hole 19, the outer jacket of the filter pipe being surrounded by a gravel bed 21, which fills a space between the bore hole 19 and the filter pipe 20, which has a correspondingly smaller diameter. The deep well 10 is sunk into the soil in a manner such that it runs into the corner of the contaminated zone 17, which is downstream with respect to the ground water flow direction 18, the deep well 10 projecting into the soil so that it ends in the lower region of the contaminated zone 17. In the present illustrative embodiment, the filter pipe 20 is only provided in the lower end region which is located in the contaminated zone 17 with openings 22 for entry of the water to be purified. The remaining, vertically running region of the filter pipe 20 has a closed design in the present illustrative embodiment. However, it is also conceivable, for simpler design of the filter pipe 20, that it be provided with openings 22 over a larger length or over its entire length.

The contaminated water withdrawn from the soil from the deep well 10 by means of a pump, which is not shown in the figures, is initially fed, in the present illustrative embodiment, to the ozonization unit 11. This is used for oxidative breakdown of substances which are difficult to degrade in order to make them more readily susceptible to biological purification.

In the present illustrative embodiment, the biological purification equipment 12, located downstream of the ozonization unit 11, has a metering station 23, from which the water to be purified biologically is fed consecutively to two trickling filters, alongside one another in the present illustrative embodiment, namely rotating, cylindrical dipping drum reactors 24 and 25, also known as rotating biological contactors (RBC). The first dipping drum reactor 24 forms a first, anaerobic biological step, in which the water to be purified is treated in a gas-tight environment for microbial degradation of the pollutants, in particular hydrocarbons.

The second dipping drum reactor 25 is designed as an aerobic biological step, in which the excess secondary substances from the first anaerobic biological step are eliminated while passing in oxygen. Alternatively, the biological purification equipment 12 can also have a design as evident from German DE-OS 34 47 177 which corresponds to U.S. application Ser. Nos. 06/800,939 (filed Nov. 22, 1985 and now abandoned) and 07/121,835 (filed Nov. 17, 1987); and from German DE-OS 3,537,307.

The biological purification of the water is followed by mechanical filtration to remove essentially degraded biological material, in the present case by means of a mechanical belt-discharge drum filter 13 located downstream of the biological purification equipment.

Figure 3:
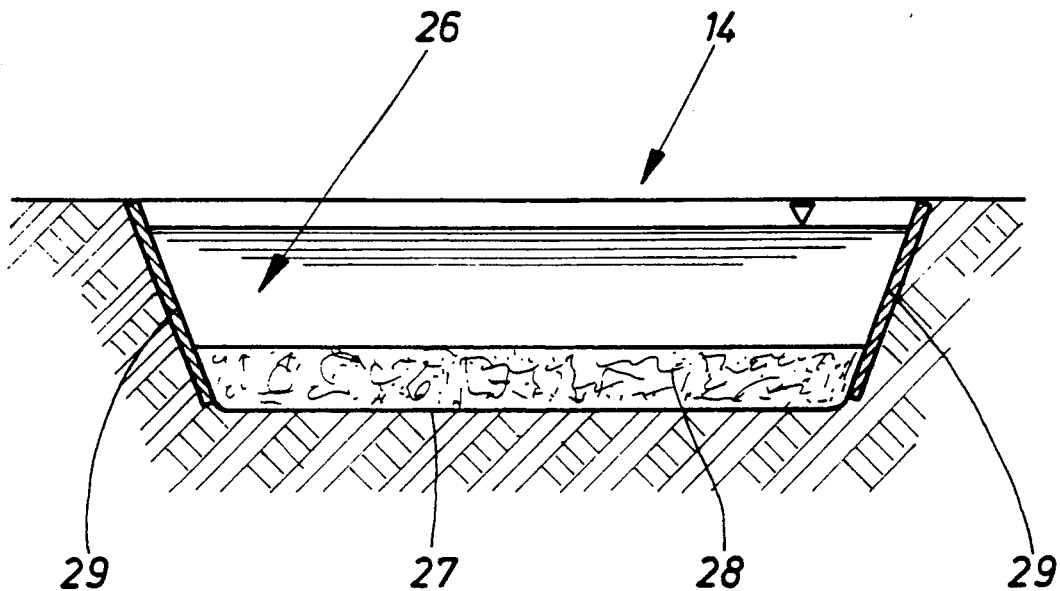
FIG. 3 shows a cross-section through a percolation basin.
Figure 4:
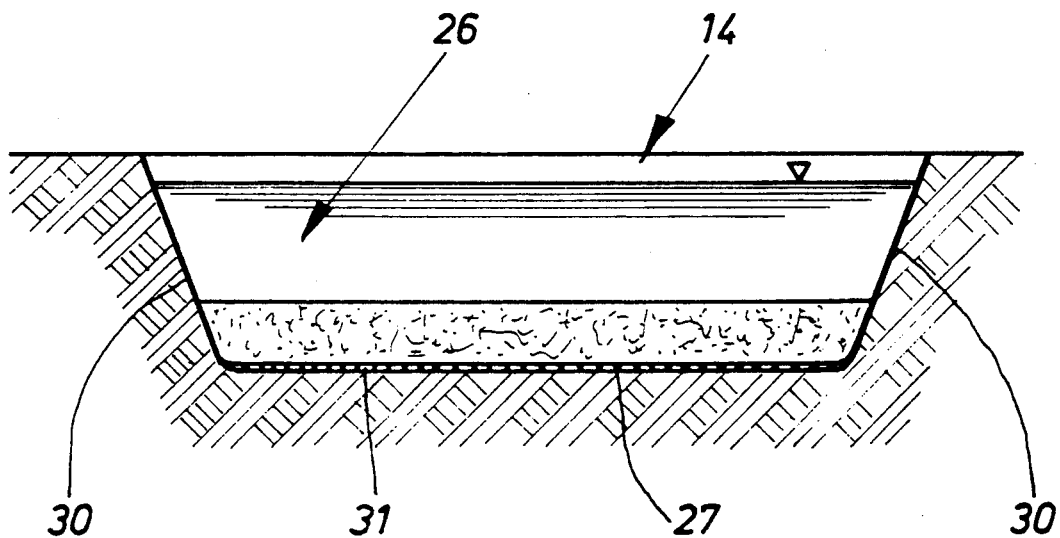
FIG. 4 shows a cross-section through an alternative embodiment of the percolation basin.

The slow filter 14, located downstream of the belt-discharge drum filter 13, can have a design as shown in FIG. 3 or 4. In both cases, the slow filter 14 is designed in pond form, namely comprises a percolation basin 26, sunk into the soil, having a rectangular base as in the illustrative embodiment shown. However, the percolation basin 26 may equally well have a different base shape, for example a circular base. The two embodiments shown here for the slow filters 14 are designed to be water-permeable in the region of their base 27. The water in the slow filter 14 can thus soak through the soil 27 into the ground. The filter material used in both cases is a filter layer 28 which fully covers the soil 27 and can comprise, in the simplest case, a gravel bed colonized by a long-lived biosystem. The walls 29 of the percolation basin 26 are inclined, to be precise in a manner such that opposite walls 29 converge towards the base 27.

In the illustrative embodiment of FIG. 3, the walls 29 are designed to be water-impermeable all the way round, namely covered by water-tight sheets bonded to one another or by a continuous concrete layer. This ensures support of the ground in the region of the walls 29. In this case, it is therefore also possible for the walls 29 to be vertical. The base 27 of the percolation basin 26 is, in this illustrative embodiment, covered only by the filter layer 28. The entire base area is therefore available for the purified water to soak into the ground.

The entire percolation basin of FIG. 4 is lined by sheeting 30. This is water-impermeable in the region of the walls 29, whereas the sheeting 30 is designed to be water-permeable in the region of the base 27, for which purpose the sheeting 30 is provided in this region with holes 31 distributed over the area of the base 27 in a grid-like pattern. Alternatively, the sheeting in the region of the base 27 can also comprise a water-permeable textile material. In this case, the filter layer 28 can, if desired, be omitted in the percolation basin, i.e. the textile material in the region of the base 27 with bacteria settled thereon serve directly as a filter.

It is furthermore possible to line the percolation basin 26 with sheeting only in the region of the walls 29. The base 27 is then again—as in the illustrative embodiment of FIG. 3—covered only by the filter layer 28.

The slow filter 14 is expediently positioned upstream of the contaminated zone 17, with respect to the ground water flow direction 18, i.e. in the region of the end of the contaminated zone 17 opposite the deep well 14.

The way in which the plant described functions is described in greater detail below with reference to the course of the process, in particular during flushing:

Withdrawal of the water to be purified and reintroduction into the ground at defined points in relation to the contaminated zone 17 cause flushing streams to arise in the ground in essentially two different directions. Withdrawal by means of a deep well 10 of the water to be purified causes the ground water level to be lowered, which favors a re-soaking of the purified water through the slow filter 14 into the ground to be purified. In addition, the lowering in the ground water level favors the ground water flow, namely in the ground water flow direction 18. This is further reinforced by withdrawal of the treated water through the deep well 10 at the tip of the contaminated zone 17 which is downstream with respect to the ground water flow direction 18, while the purified water is re-introduced through the slow filter 14 upstream of the contaminated zone 17, with respect to the ground water flow direction. It thus flows in the ground water flow direction 18 from the point of introduction of the purified water into the ground to re-withdrawal through the deep well 10.

In the case of above-ground purification of the contaminated ground water, the distance between the deep well 10 and the slow filter 14 is bridged by transporting the water in the opposite direction to the ground water flow direction 18 along the ozonization unit 11, the biological purification equipment 12, the mechanical belt-discharge drum filter 13 and the slow filter 14.

The course of the process in the biological purification equipment 12 corresponds to that which has been disclosed, for example, in German Offenlegungsschriften 3,442,510 (which corresponds to U.S. application Ser. Nos. 06/800,939 (filed Nov. 22, 1985 and now abandoned) and 07/121,835 (filed Nov. 17, 1987) and 3,537,307.

We claim:

1. A process for removing soil contaminants for purification of ground water, comprising the steps of:
    withdrawing from the soil the water which is to be purified;
    biologically purifying the withdrawn water above ground in rotating dipping drum reactors, first in an anaerobically working reactor and, then, in an aerobically working reactor thereby producing essentially degraded biological material;
    removing the degraded biological material by means of a mechanical filter;
    eliminating sparingly soluble residual contaminants by means of a slow filer (14) on which a long-lived biosystem is colonized; and
    re-introducing the biologically purified water into the soil to flush it through the soil.

2. The process as claimed in claim 1, wherein the biological purification is preceded by ozonization.

3. The process as claimed in claim 1, wherein, in order to flush the biologically purified water through the soil, the ground water level is lowered by withdrawal of water and raised again by re-introducing the purified water above the water level.

4. The process as claimed in claim 3, wherein the water is withdrawn from the soil at a point other than that at which it is re-introduced, in a manner such that, on soaking into the soil, the water flows in a ground water flow direction (18) to form a continuous flushing stream.

5. The process as claimed in claim 4, wherein the continuous flushing stream is matched to the duration of the biological degradation processes in the slow filter (14).

6. A plant for removing soil contaminants for purification of ground water, comprising:
    at least one ground eater withdrawal-shaft sunk in the soil for withdrawing ground water from the soil;
    above-ground biological purification equipment (12) for biologically purifying withdrawn water and having at least two rotating, biologically working dipping drum reactors (24,25), one (24) of which works anaerobically without passing in oxygen, and the other (25) of which works aerobically by passing in oxygen;
    above-ground pumping equipment for pumping the ground water to said purification equipment; and
    at least one re-introduction means, coupled to the purification equipment, for reintroducing the purified water into the soil; and
    further comprising a mechanical filter (13), located downstream of the biological purification equipment (12), for removing degraded biological material;
    wherein said re-introduction means comprises a slow filter (14) which is located downstream of said mechanical filter (13) and on which a biosystem is colonized.

7. The plant as claimed in claim 6, wherein the mechanical filter (13) is integrated in the biological purification equipment (12).

8. The plant as claimed in claim 6, wherein the slow filter (14) is a percolation basin (26) sunk into the soil.

9. The plant as claimed in claim 8, wherein the percolation basin (26) of the slow filter (14) has inclined walls (29).

10. The plant as claimed in claim 9, wherein a base (27) of the slow filter (14) is water-permeable.

11. The plant as claimed in claim 10, wherein the water-permeable base (27) of the percolation basin (26) has a filter layer (28) in the form of a gravel bed.

12. The plant as claimed in claim 10, wherein at least one of the walls (29) of the percolation basin (26) is lined with sheeting (30).

13. The plant as claimed in claim 12, wherein a long-lived bio-system has colonized the filter layer (28) and the sheeting (30).

14. The plant as claimed in claims 10 or 12, wherein the walls (29) and the base (27) of the percolation basin (26) are covered by continuous sheeting which is water-permeable in a region thereof covering the base (27).

* * * * *